Figure 1:
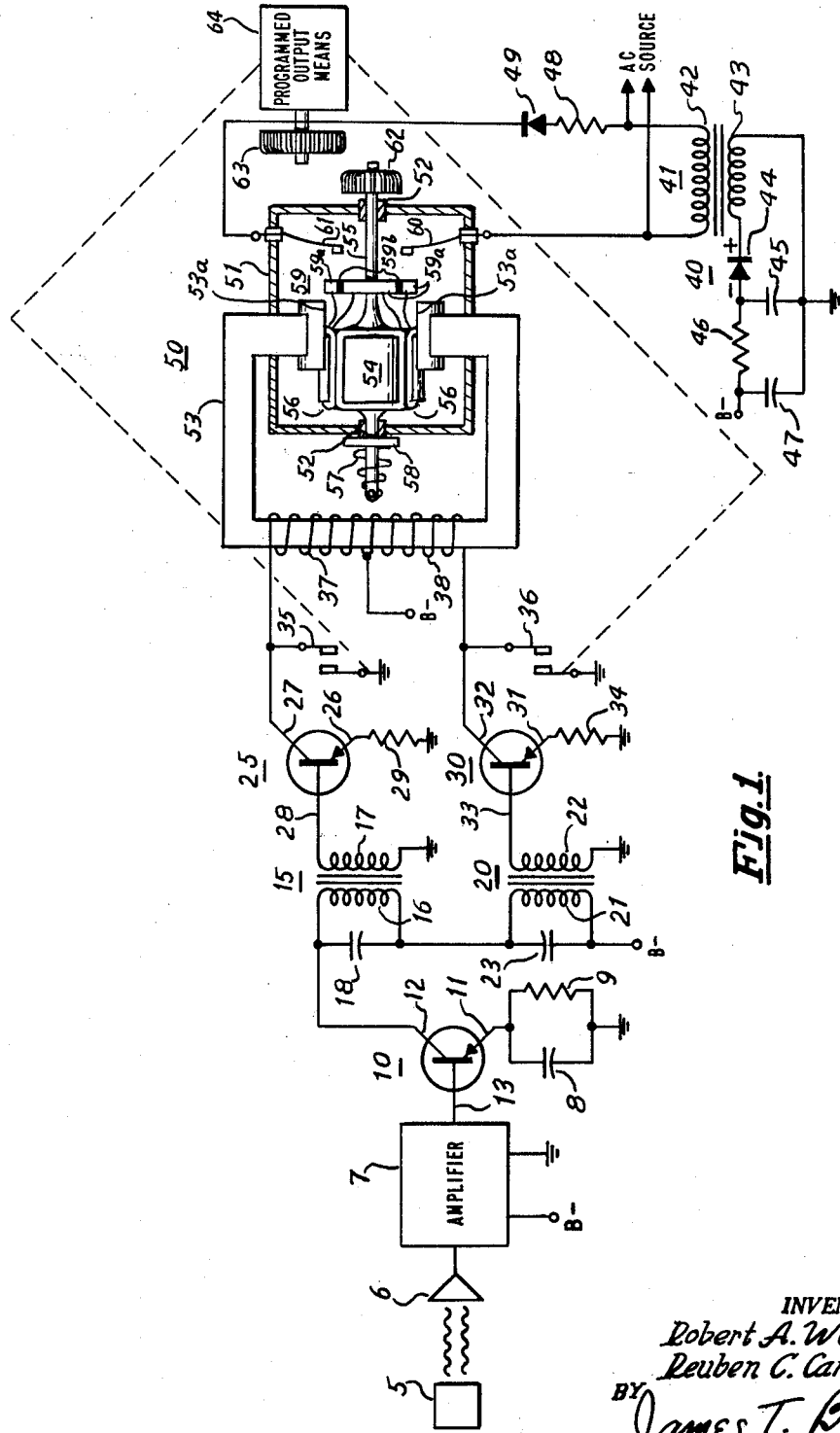

United States Patent Office

3,192,460
Patented June 29, 1965

3,192,460
REVERSIBLE D.C. MOTOR WITH AXIALLY SHIFTABLE ROTOR
Robert A. Wolff, La Grange Park, and Reuben C. Carlson, Bensenville, Ill., assignors to Admiral Corporation, Chicago, Ill., a corporation of Delaware
Filed Apr. 25, 1961, Ser. No. 105,492
7 Claims. (Cl. 318—300)

This invention relates to a direct current motor control system adapted to be energized directly from the output circuit of a transistor. A copending application of Robert A. Wolff entitled "Remote Control System," Serial No. 85,029, filed January 26, 1961, discloses a transistorized remote control system utilizing a bidirectional direct current motor which is directly coupled in the common portion of the individual load circuits of the output transistors. While the circuit of said copending application performs satisfactorily, for relatively large motor loads it is necessary to utilize large output transistors.

The circuit of the invention incorporates a D.C. motor of novel construction which requires the output control transistor to supply only a fraction of the requisite motor power. In the circuit of the invention the field winding of the D.C. motor is connected as the transistor output circuit load. The motor armature is arranged to be normally held in a position such that only a portion of the field flux passes therethrough. Upon energization of the field, the armature is moved axially by magnetic action so that substantially all of the armature is in the energizing field.

In a preferred form of the invention the armature has an end-type segmented commutator mounted coaxially therewith. A brush structure is arranged to make electrical contact with the commutator segments and is connected across a source of direct current energizing potential. In one embodiment, when the field is deenergized the brush structure and commutator are not in electrical contact. When the field is energized, the armature moves axially to align itself therewith and the brush structure makes electrical contact with the commutator, thus energizing the armature for rotation. In another embodiment, the brushes are always in contact with the commutator, but the armature circuit is not completed until energization of the field and axial movement of the armature.

With this arrangement the control circuit need only supply a fraction of the requisite power for the motor and load. The arrangement also facilitates the use of a bidirectional direct current motor as will be more fully discussed hereinafter.

The construction of the motor affords advantages not obtainable with conventional prior art constructions. A foremost advantage is that low power, inexpensive transistors may be used in the control circuit, since the control circuit need only supply the field energizing power for the motor. Heretofore, such systems required the use of separate relays, or large power transistors, to perform similar functions. Another advantage is that with the invention, the motor load is physically disengaged from the motor immediately upon deenergization of the field winding. Thus, programming of the output means (load) becomes relatively simple and uncritical. In other words, problems due to armature "coasting" upon deenergization are eliminated.

Accordingly, it is a principal object of this invention to provide a novel remote control system employing a direct current motor.

Another object of this invention is to provide a completely transistorized control system for controlling a direct current motor.

A further object of this invention is to provide a control system utilizing a direct current motor of novel construction whereby only a fraction of the power required by said motor need be supplied by the control system.

Still another object of this invention is to provide a direct current motor control system utilizing a transistor for energizing the field circuit of a motor which has an axially movable armature and commutator for completing a power connection to said motor armature upon energization of said field.

A still further object of this invention is to provide a novel direct current motor incorporating a separately energizable field and armature, and in which the armature is axially movable by energization of the field from a first deenergized position to a second energized position.

Figure 2:
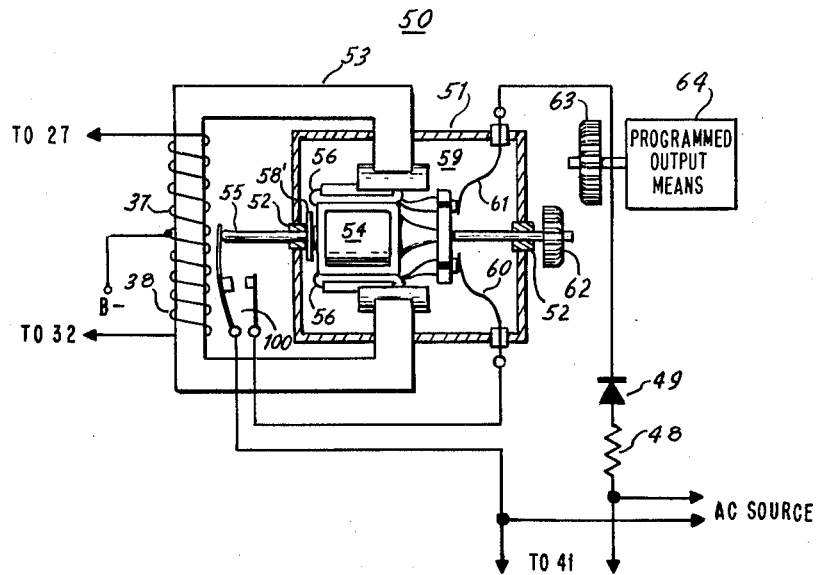

Further objects of this invention will become apparent upon a reading of the following specification in conjunction with the drawings in which:

FIG. 1 discloses one embodiment of a control system including a direct current motor of novel construction;
FIG. 2 discloses a modification in construction of the motor.

Referring now to FIG. 1, transmitter 5 is shown, with a microphone 6 for receiving the transmissions therefrom. Transmitter 5 may comprise any of numerous well known means for generating control signals, the only criterion being that the transmitter and receiver be compatible with each other. In the preferred environment of the invention, transmitter 5 is a portable unit for generating ultrasonic signals of predetermined frequency and duration. Consequently, the receiver portion comprises a microphone adapted to receive the transmitted ultrasonic control signals. Microphone 6 converts the acoustic control signals into corresponding electrical control signals which are amplified in amplifier 7 (preferably a completely transistorized unit) and coupled to the base 13 of a transistor 10. Transistor 10 includes a collector 12, and an emitter 11 which is coupled to ground through the parallel combination of a capacitor 8 and a resistor 9. This parallel combination of elements provides proper bias potentials for transistor 10. The output circuit of transistor 10 includes a serially connected pair of tuned circuits.

In the embodiment chosen for the purpose of illustrating the invention, transmitter 5 is assumed to be capable of transmitting at least two distinct ultrasonic control signals which differ only in frequency. Microphone 6, amplifier 7, and transistor 10, are all capable of passing both of these signal frequencies.

Tuned circuit 15 includes a transformer having a primary winding 16, bridged by a tuning capacitor 18, and a secondary winding 17. Tuned circuit 20 similarly comprises a transformer having a primary winding 21, bridged by a tuning capacitor 23, and a secondary winding 22. Each of these tuned circuits is tuned to respond to one of the control frequencies which may be generated by transmitter 5. Consequently, if for example, a first control signal is received by microphone 6, which signal corresponds in frequency to that to which circuit 15 is tuned, substantially all of the output voltage of transistor 10 will appear across tuned circuit 15. If the situation is reversed and the transmitted signal corresponds in frequency to the frequency of tuned circuit 20, substantially all of the output voltage of transistor 10 is developed across tuned circuit 20. Thus, a frequency discriminating action is obtained by using serially connected tuned circuits 15 and 20.

Assuming that tuned circuit 15 is energized, a voltage is developed across transformer secondary winding 17, which voltage is coupled to the base 28 of a transistor 25. Transistor 25 also has an emitter 26 and a collector 27. A small emitter resistor 29 is utilized for stabilization. Transistor 25 is of the PNP type which requires that its base be negative with respect to its emitter for input current to flow. Since the signal appearing across winding 17 is alternating, simultaneous rectification and amplification is obtained in transistor 25, as only the negative excursions of signal cause current flow in the input circuit. Thus, a pulsating direct current flows in the output circuit thereof. A field energizing winding 37 is connected in series with the emitter-collector circuit of transistor 25 and consequently any current flowing in said circuit also flows through the winding. Winding 37 is wound in magnetic relationship with an iron core 53 terminating in pole pieces 53a, which forms the field structure for a direct current motor 50.

The secondary winding 22 of tuned circuit 20 feeds base 33 of transistor 30. Transistor 30 has an emitter 31 and a collector 32 and an emitter stabilizing resistor 34. Another energizing winding 38, which may be an extension of winding 37, is connected in the output circuit of transistor 30 and is effective to generate magnetic flux in core 53 upon current flow in the output circuit of transistor 30. It should be noted that windings 37 and 38 may be, and in the preferred embodiment are, opposite halves of one complete winding. They are connected such that load current flow therethrough is always in one direction in winding 37 and the opposite direction in winding 38. Thus, when winding 37 is energized, a magnetic flux in one direction is established in core 53, and when winding 38 is energized a magnetic flux in the opposite direction is established.

Direct current motor 50 includes a housing 51 (shown in cross section) in which an armature 54 is mounted. In the drawing, housing 51 is assumed to be both nonmagnetic and nonconductive. Other materials may be utilized with suitable care being exercised regarding magnetic and electrical effects. Armature 54 includes a shaft 55, support bearings 52, armature windings 56 and an end-type commutator 59 including a number of conductive segments 59a separated by nonconductive segments 59b. The conductive segments 59a are connected to armature windings 56 in the well known manner for connecting direct current armature windings to commutators. At one end of shaft 55, outside of housing 51, there is a driving gear 62 which is slidably engageable with a driven gear 63. At the other end of shaft 55, outside of housing 51, there is a bearing washer 58 and a bias spring 57, which is affixed to the shaft and arranged to be movable relative to washer 52.

A brush structure comprising brushes 60 and 61 is arranged, as shown, about the axis of armature 54 in alignment with commutator 59. However, due to the action of spring 57, armature 54 is biased toward the left end of housing 51 and commutator 59 is out of electrical engagement with brushes 60 and 61, and gear 62 is disengaged from gear 63.

A power supply 40 is provided for connection to an ordinary household source of alternating current and comprises a transformer 41 having a primary winding 42 and a low voltage secondary winding 43. The low voltage winding develops the required operating potential for the transistorized circuitry previously described and includes a diode 44 and a filter arrangement including capacitors 45 and 47 and resistor 46. This arrangement is standard in the art and needs no detailed description.

One end of transformer primary winding 41 is connected to brush 60 and the other end is connected to brush 61 through a series combination of a resistor 48 and a diode 49. The diode permits unidirectional current flow and consequently a direct current voltage appears across brushes 60 and 61.

Gear 63 is shown connected in driving relationship with a block 64 laballed PROGRAMMED OUTPUT MEANS. Block 64 may contain apparatus for performing any of a number of desired functions. In a television environment, block 64 may comprise a bidirectional station tuning arrangement for the receiver which includes means (not shown) for selectively operating switches 35 and 36 in accordance with a preset operating sequence. The operative connections are indicated by the dashed lines joining switches 35 and 36, respectively, with output means 64.

Motor 50 is shown in its deenergized condition and it will be noted that armature 54 is displaced with respect to the projections of pole faces 53a of core 53, by virtue of the action of spring 57. In this position, brushes 60 and 61 are out of electrical engagement with commutator 59 and consequently there is no current flow through armature windings 56.

Assume that a control signal corresponding to the frequency of tuned circuit 15 is received from transmitter 5. Transistor 25 is driven conductive along its emitter-collector path and a unidirectional current flows through field winding 37. This current flows from the B— terminal of power supply 40, through winding 37, through collector 27 and emitter 26, to ground. Magnetic flux is therefore established in core 53. The magnetic field developed between pole faces 53a pulls armature 54 axially against the urging of spring 57 so that armature 54 is substantially completely within the area defined by the projection of pole faces 53a of core 53. In moving axially, armature 54 moves commutator 59 into electrical engagement with brushes 60 and 61, thus energizing armature windings 56. Simultaneously, or a very short time later, gear 62 is forced into driving engagement with gear 63. Armature 54 rotates, since now both its field structure and its armature windings are energized. The direction of rotation is determined by the direction of the field flux in core 53.

Upon rotation of gear 63 a predetermined distance, switch 35 is closed by means (not shown) in block 64. Thus, a short circuit is placed across the output circuit of transistor 25 and field winding 37 is maintained in an energized condition irrespective of the conductive state of transistor 25. When the particular output means, driven by gear 63, reaches a predetermined position, (in the case of a television station selector this position corresponds to the next adjacent station tuning position) switch 35 is opened. Due to the nature of the transmitted signal, transistor 25 will be in a nonconductive state sometime prior to opening of switch 35 and consequently, when switch 35 is opened, the circuit for field winding 37 is broken and the field flux in core 53 collapses. Upon collapse of the flux in core 53, armature 54 is moved axially by spring 57 to disengage gear 62 from gear 63 and to disconnect commutator 59 from brushes 60 and 61.

A similar action obtains when a signal corresponding to the frequency of tuned circuit 20 is received from transmitter 5. In this case, however, field winding 38 is energized responsive to conduction along the emitter-collector path of transistor 30. Current flow through field winding 38 is opposite to that which previously existed in field winding 37. Therefore, the field flux established in core 53 is now in the opposite magnetic direction. Armature 54 is again axially displaced, against the urging of spring 57, into the position mentioned previously. Commutator 59 is driven into electrical engagement with brushes 60 and 61 to complete an energizing circuit for armature windings 56, and gear 62 engages gear 63. Armature 54 now rotates in the opposite direction since the field flux has been reversed. The output means in block 64 is effective to close switch 36 and maintain field winding 38 energized and further operations are performed in substantially the same manner previously described.

In FIG. 2 a modified construction of motor 50 is shown. In the main, the construction of FIG. 2 obviates the need for spring 57, and further, eliminates any possibility of abnormal arcing between the brushes and the commutator since, in the FIG. 2 construction, the brushes are always in electrical contact with commutator 59. Brushes 60 and 61 are designed to provide the bias force for armature 54, which force was applied by spring 57 in FIG. 1. A stop washer 58' is provided to define the rest position of armature 54.

The armature circuit is arranged to be opened and closed via a switch 100 which is actuated by axial movement of the end of shaft 55. In view of the operative description of FIG. 1, operation of the arrangement of FIG. 2 should be obvious.

The arrangement of both FIGS. 1 and 2 eliminate the problem of armature "coasting" after deenergization. This is so since the driving connection between gears 62 and 63 is broken immediately upon deenergization of the motor field. Positive engagement between gears 62 and 63 is assured by tapering them as shown. This latter step may also be obviated by allowing the armature energizing circuit to be completed just prior to gears 62 and 63 engaging. In this case, the armature will begin rotating to insure engagement between the gears.

A further advantage obtained with the system of the invention is that of noise immunity. In the event that both tuned circuits 15 and 20 are energized to some degree, the load currents flowing through field windings 37 and 38 respectively, tend to set up opposing magnetic field fluxes in core 53 with the result that armature 54 will not be axially moved since insufficient net flux will be developed.

Various other modifications in the structure and arrangement of motor 50 may be readily envisioned. The particular configurations of commutator 59 and brushes 60 and 61 merely represent a preferred form of construction and are not to be considered as limitations of the invention. The same is true for the particular circuit arrangements shown.

What has been described is a novel arrangement of a remotely controlled transistorized direct current motor drive system which allows the control transistors to supply only a fractional amount of the power required by the direct current motor load. It is understood that numerous modifications may be made in both the structure and the arrangement of illustrated components without departing from the true spirit and scope of the invention as set forth in the appended claims.

What is claimed is:

1. In combination; receiving means having an input circuit and an output circuit; means for energizing said input circuit responsive to receipt of a control signal having predetermined characteristics, said input circuit upon energization energizing said output circuit; a direct current motor including an armature mounted for both rotational and axial movement; a commutator secured to said armature; a pair of brushes arranged for electrical engagement with said commutator; a source of direct current connected across said brushes; a field structure for generating a magnetic field traversing said armature; an energizing winding connected in flux producing relationship with said field structure and being included in said output circuit; means for mechanically urging said armature out of the field of said field structure to a position such that said commutator and said brushes are not in electrical engagement with each other; said armature being moved against said means for mechanically urging, upon energization of said field structure by said output circuit, whereby said commutator and said brushes are brought into electrical engagement and said armature is caused to rotate.

2. A bidirectional direct current motor drive system adapted to be selectively energized by a pair of control signals comprising; means for receiving and amplifying said control signals; discriminating means including a pair of output circuits selectively energizable responsive to receipt of said control signals; a bidirectional direct current motor comprising; a field structure having a pair of energizing windings thereon; an armature, including a commutator, mounted for rotational and axial movement; a direct current source; a pair of commutator engaging brushes connected across said direct current source; means for mechanically urging said armature in an axial direction whereby said armature is partially within the flux path of said field structure and whereby said commutator is out of engagement with said brushes; said field structure generating a magnetic flux in one direction responsive to energization of a first of said pair of output circuits and a magnetic flux in an opposite direction responsive to energization of a second of said pair of output circuits, said armature being magnetically pulled axially into the resultant magnetic field against the urging of said mechanical urging means and closing an electrical circuit between said commutator and said brushes, whereby said armature is rotated in a first direction responsive to energization of said first output circuit and in the opposite direction responsive to energization of said second output circuit.

3. In combination; a direct current motor including an armature mounted for both rotational and axial movement; a pair of field poles oppositely disposed about said armature normal to the axis thereof; an energizing winding arranged to produce a magnetic flux between said field poles; a commutator mounted on said armature; a pair of brushes arranged to engage said commutator; a source of direct current power connected across said brushes; means for urging said armature axially to a position where a substantial portion of said armature lies outside the normal flux path between said pole pieces and where said commutator and said brushes are not in electrical contact; a transistor having an input circuit and an output circuit, said output circuit including said energizing winding; and means for energizing said input circuit whereby said output circuit is energized and said energizing winding develops magnetic flux between said pole pieces; said armature being moved axially against the action of said means for urging into a position where said armature is substantially completely within the flux between said pole pieces and said commutator is in electrical contact with said brushes.

4. A direct current motor comprising; flux means for developing a magnetic flux field; an armature, including energizing windings and a disc type commutator connected to said windings, mounted for both rotational and axial movement within said flux field; means, including at least one spring biased commutator engaging brush for urging said armature in an axial direction partially out of said flux field, for normally maintaining said energizing windings deenergized; a power source for energizing said energizing windings; means for completing an electrical circuit between said energizing windings and said power source responsive to said armature being substantially completely within said flux field; and means for energizing said flux means, whereby said armature is magnetically pulled axially substantially completely within said flux field.

5. A direct current motor comprising; flux means for developing a magnetic flux field; armature means including, a core of magnetic material mounted on a shaft, energizing windings in magnetic relation with said core, and a disc type commutator mounted normal to said shaft; means for mounting said shaft for both rotational and axial movement; switch means actuatable to complete an electrical circuit by axial movement of one end of said shaft responsive to said armature means being moved from a first position to a second position; a power source for said energizing windings; a pair of spring biased commutator engaging brushes for urging said armature means axially into said first position, said core being partially out of the flux field of said flux means when said armature means is in said first position; said brushes and said switch means being connected in series with said power source and said energizing windings; and means for energizing said flux means whereby said core is drawn substantially completely into the resultant flux field and moves said armature means axially into said second position.

6. A direct current motor as set forth in claim 5 further including a driving element mounted on said shaft, and a driven element arranged to be drivingly engaged with said driving element upon axial movement of said armature means from said first position to said second position.

7. In combination: receiving means having an input circuit and an output circuit; means for energizing said input circuit responsive to receipt of a control signal having predetermined characteristics, said input circuit upon energization energizing said output circuit; a direct current motor including an armature mounted for both rotational and axial movement; a commutator secured to said armature; a pair of brushes; a source of direct current; an armature circuit including said armature, said brushes, said commutator, said direct current source and interruption means; a field structure for generating a magnetic field traversing said armature; an energizing winding connected in flux producing relationship with said field structure and being included in said output circuit; means for mechanically urging said armature out of said field of said field structure to a position such that said interruption means interrupts said armature circuit; said armature being moved against said means for mechanically urging, upon energization of said field structure by said output circuit, whereby said interruption means completes said armature circuit and said armature is caused to rotate.

References Cited by the Examiner
UNITED STATES PATENTS

| | | | |
|---|---|---|---|
| 1,837,974 | 12/31 | Lillard et al. | 390—381 |
| 2,670,449 | 2/54 | Brice | 310—209 |
| 2,715,707 | 8/55 | Haskins | 318—480 |
| 2,989,679 | 6/61 | Guzskie | 318—460 X |

ORIS L. RADER, *Primary Examiner.*

JOHN F. COUCH, *Examiner.*